No. 880,887. PATENTED MAR. 3, 1908.
J. W. HOLMAN.
BERRY PICKER.
APPLICATION FILED NOV. 14, 1907.
2 SHEETS—SHEET 1.
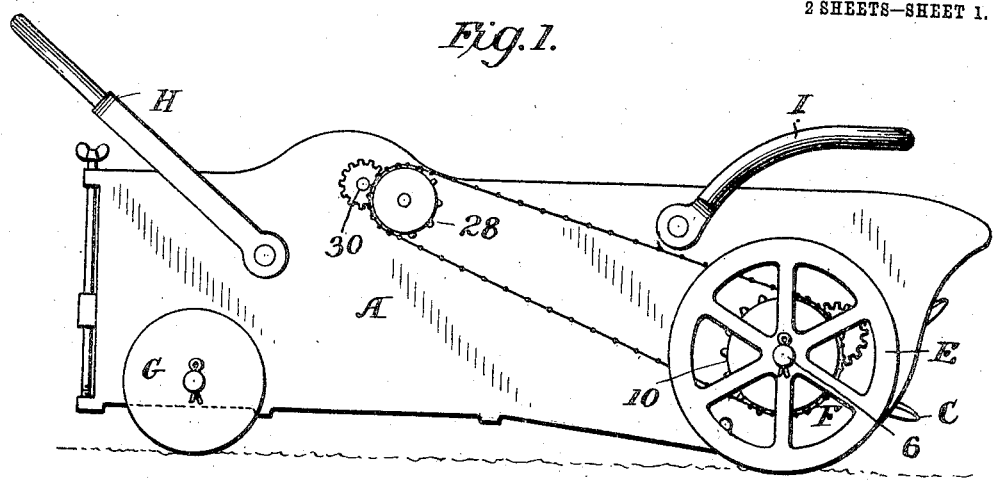
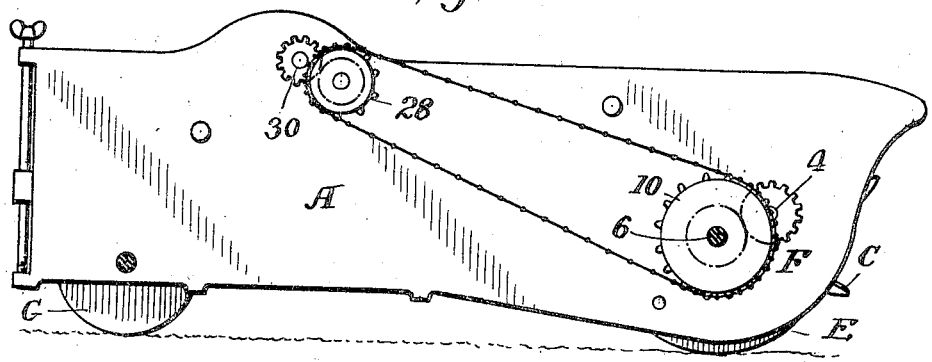
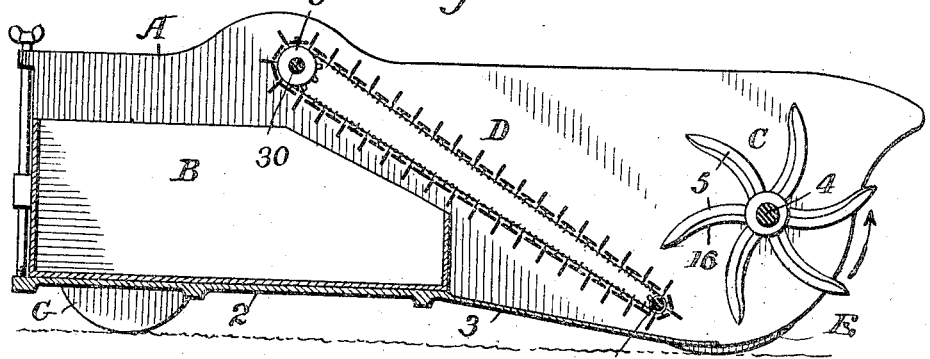
Inventor
John W. Holman
by Esher, Freeman, Watson & Coit,
Attorneys
Witnesses No. 880,887. PATENTED MAR. 3, 1908.
J. W. HOLMAN.
BERRY PICKER.
APPLICATION FILED NOV. 14, 1907.

2 SHEETS—SHEET 2.

Witnesses
F. G. Finkel
J. J. McCarthy

Inventor
John W. Holman
by Foster, Freeman, Watson & Coit,
Attorneys

UNITED STATES PATENT OFFICE.

JOHN W. HOLMAN, OF WEST CREEK, NEW JERSEY.

BERRY-PICKER.

No. 880,887.

Specification of Letters Patent.

Patented March 3, 1908.

Application filed November 14, 1907. Serial No. 402,221.

*To all whom it may concern:*

Be it known that I, JOHN W. HOLMAN, a citizen of the United States, residing at West Creek, Eagleswood township, Ocean county, New Jersey, have invented certain new and useful Improvements in Berry-Pickers, of which the following is a specification.

Figure 4:
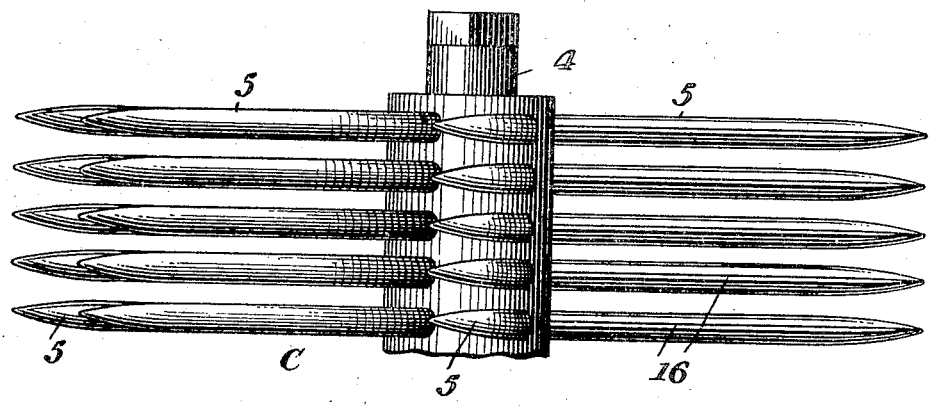
Figure 5:
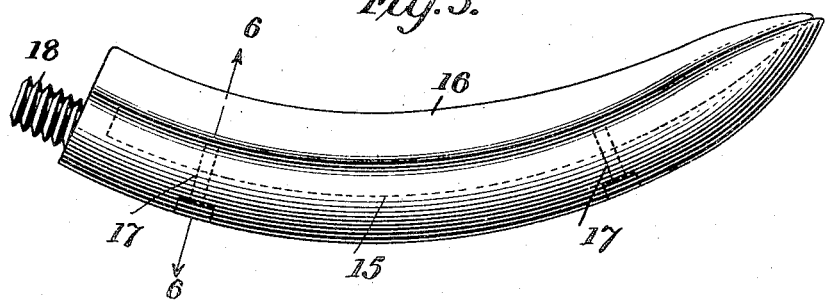
Figure 6:
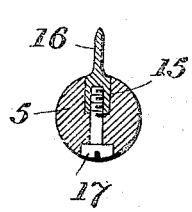
Figure 7:
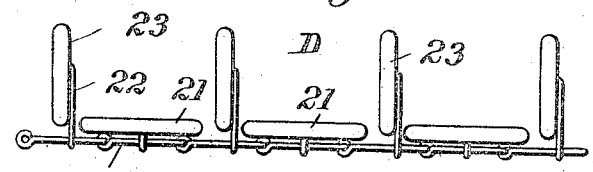
Figure 8:
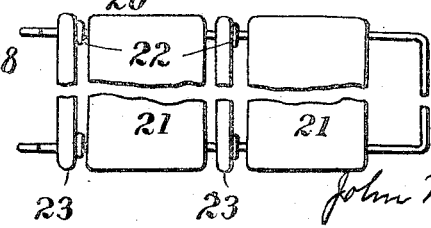

My invention relates to berry pickers, especially that class of pickers intended for picking cranberries, and my invention consists in the construction and arrangement of a rotary picker with radial arms and an endless carrier and a means for driving the same, as fully set forth hereinafter and illustrated in the accompanying drawing, in which:

Figure 1 is a side elevation of a picker embodying my improvement; Fig. 2 the same showing the transmission gear between the drivers and the shafts; Fig. 3 a longitudinal central sectional elevation; Fig. 4 a plan view showing one end of the picker; Fig. 5 an enlarged detached view of one of the picker arms; Fig. 6 a section on the line 6—6 Fig. 5; Fig. 7 an enlarged detached view of a section of the carrier. Fig. 8 is a plan showing a part of the carrier.

The frame A of the apparatus is of any suitable construction to support parts hereinafter described, but preferably has side plates with supports 2—2 for a detachable hopper B and a guard plate 3 extending from below said hopper to a position below a picker C. This picker may be of any suitable character, but as shown consists of a shaft 4 having curved radial arms 5, the said shaft turning in bearings in the frame and being driven from a drive wheel E through a suitable system of gears F so as to secure a more rapid movement of the picker than that of the drive wheel.

Preferably the drive wheel turns detachably upon a stud 6 so that drive wheels of different sizes may be applied to said stud where it is necessary to vary the distance of the frame from the ground, and the periphery of the drive wheel may be serrated.

At a point above the guard plate 3 and between the latter and the picker turns loosely a roller 8, and at a point above the hopper turns a roller 9, and around these rollers passes an endless carrier D of suitable construction, and the roller 9 is driven from one of the gears driven by the drive wheel. As shown there is a sprocket wheel 28 geared with the shaft of the roller 9 and receiving a chain which passes to a sprocket wheel 10 connected with the gear driven by the driving wheel. If desired there may be a drive wheel at each side of the apparatus, and while the rear end of the frame may be supported by runners I prefer to use supporting wheels G.

The arms 5 of the picker may be curved bars of any suitable character but as shown in Figs. 5 and 6 each consists of a round bar with a socket to receive the thickened edge portion 15 of a blade 16 which is secured in place in the arm by means of bolts 17. These blades may therefore be renewed from time to time as required without the necessity of changing the arms. While the arms may be secured permanently to the shaft 4 they are preferably provided with threaded studs 18 screwing into threaded sockets of the shaft so as to be detachable, and thus any arm which becomes worn or broken may be readily replaced. While the carrier D may be of any suitable character I prefer to construct it of one or more chains 20 of flat connected links and to support flat upon these links blades 21 of thin wood or other like material, and to fingers 22 extending about right angles from the links are connected blades 23 which retain the berries after they are picked and thrown onto the carrier by the picker, in connection with the blades 21, until they pass beyond the roller 9 when they fall into the hopper.

The frame may be provided with suitable bails H, I, by means of which it may be pulled or pushed over the ground, the curved arms entering beneath the plants and rising and drawing back the berries which are supported by the arms, the latter preferably being about one-fourth of an inch apart so that both a raking and a picking effect is secured.

The picker is so geared with the driving wheel that as it rotates the forward arms are carried upward. This results in the ends of the arms being introduced among the vines near the ground and then moving upward and carrying off the berries and tends to open up and loosen the vine so as to insure the proper separation of the berries.

Without limiting myself to the construction and arrangement shown, I claim:

1. The combination in a cranberry picker, of a frame, a picker consisting of a shaft carried by the frame and radial arms, a receptacle supported at the rear of the frame, an endless carrier supported at the front at a point below the picker and at the rear at a point above the receptacle, and a drive wheel and means for rotating the shaft and driving belt therefrom.

2. The combination in a cranberry picker, of a frame, a picker consisting of a shaft carried by the frame and radial arms, a receptacle supported at the rear of the frame, an endless carrier supported at the front at a point below the picker and at the rear at a point above the receptacle, drive wheels and means for supporting the shaft and driving the belt therefrom, and a guard plate below the carrier.

3. The combination with the frame, receptacle, and picker of a berry picker, of a drive wheel, and an endless carrier, rollers supporting the carrier at the front below the picker and at the rear above the receptacle, and means for driving the rear roller and the picker constructed to impart an upward movement to the picker arms at the front of the machine for the purpose set forth.

4. The combination in a berry picker of a frame, a guard plate supported at the bottom of the frame, supports for a detachable receptacle above the rear of the guard plate, a picker forward and above the front edge of the guard plate, an endless carrier extending from a point between the picker and guard plate to a point above the receptacle, a drive wheel, and means for driving the picker and carrier from the drive wheel.

5. The combination with the frame of a berry picker, of a picker consisting of a shaft, and a series of curved arms radiating from said shaft, each with a longitudinal socket and a blade fitted detachably to said socket.

6. A picker for berries consisting of a shaft, series of radial curved arms, and blades connected detachably to said arms.

7. The combination in a berry picker of a frame, rotatable picker, receptacle, endless carrier, and rollers supporting the carrier, said carrier consisting of an endless band or chain and two series of transverse slats one lying flat on the chain and the other at right angles to the chain.

In testimony whereof I affix my signature in presence of two witnesses.

JOHN W. HOLMAN.

Witnesses:
JOSEPH B. COX, Jr.,
W. J. JONES.